United States Patent
Choi et al.

(10) Patent No.: US 7,894,415 B2
(45) Date of Patent: Feb. 22, 2011

(54) APPARATUS AND METHOD FOR TRANSMITTING/RECEIVING RESOURCE ALLOCATION INFORMATION IN A COMMUNICATION SYSTEM

(75) Inventors: Jin-Ghoo Choi, Seoul (KR); Chi-Hyun Park, Suwon-si (KR); Young-Hoon Kwon, Seongnam-si (KR); Sung-Soo Hwang, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 69 days.

(21) Appl. No.: 12/251,040

(22) Filed: Oct. 14, 2008

(65) Prior Publication Data

US 2009/0097423 A1    Apr. 16, 2009

(30) Foreign Application Priority Data

Oct. 12, 2007   (KR) ...................... 10-2007-0103247

(51) Int. Cl.
*H04B 7/208* (2006.01)
(52) U.S. Cl. ...................... 370/344; 370/328; 370/331; 370/337; 370/341
(58) Field of Classification Search ................. 370/280, 370/329, 331, 337, 328, 347, 344; 455/515
See application file for complete search history.

(56) References Cited

U.S. PATENT DOCUMENTS

| | | | | |
|---|---|---|---|---|
| 6,956,836 | B2 * | 10/2005 | Chen et al. .................. | 370/330 |
| 7,586,890 | B2 * | 9/2009 | Putzolu ...................... | 370/344 |
| 7,613,148 | B2 * | 11/2009 | Hong et al. .................. | 370/331 |
| 2006/0077931 | A1 * | 4/2006 | Lee et al. .................... | 370/329 |
| 2007/0109962 | A1 * | 5/2007 | Leng et al. ................... | 370/229 |
| 2007/0230326 | A1 * | 10/2007 | Pandoh et al. ............... | 370/208 |
| 2008/0248800 | A1 * | 10/2008 | Jalloul ........................ | 455/433 |
| 2009/0003293 | A1 * | 1/2009 | Yang et al. ................... | 370/338 |
| 2009/0017838 | A1 * | 1/2009 | Laroia et al. ............. | 455/456.1 |

FOREIGN PATENT DOCUMENTS

EP              1443794 A2 *    8/2004

* cited by examiner

*Primary Examiner*—Ricky Ngo
*Assistant Examiner*—Dewanda Samuel
(74) *Attorney, Agent, or Firm*—The Farrell Law Firm, P.C.

(57) ABSTRACT

An apparatus and method for transmitting/receiving resource allocation information in a communication system are provided. In the method of transmitting resource allocation information, at least one of a plurality of FDD UL FA resources is divided into a plurality of segment regions, and first resource allocation information is transmitted to mobile stations through a plurality of TDD DL FA resources. The first resource allocation information indicates, among the plurality of segment regions, each of segment regions corresponding to the TDD down link FA resources.

20 Claims, 7 Drawing Sheets

APPARATUS AND METHOD FOR TRANSMITTING/RECEIVING RESOURCE ALLOCATION INFORMATION IN A COMMUNICATION SYSTEM

PRIORITY

This application claims priority under 35 U.S.C. §119(a) to an application entitled "Apparatus and Method for Transmitting/Receiving Resource Allocation Information in Communication System" filed in the Korean Intellectual Property Office on Oct. 12, 2007 and assigned Serial No. 2007-0103247, the contents of which are incorporated herein by reference.

BACKGROUND OF THE INVENTION

1. Field of the Invention

The present invention relates generally to a communication system, and more particularly to an apparatus and method for transmitting/receiving resource allocation information in a communication system.

2. Description of the Related Art

In general, communication systems use duplexing schemes. Such duplexing schemes are broadly classified into Time Division Duplexing (TDD) schemes in which data transmission/reception is time-duplexed, and a Frequency Division Duplexing (FDD) schemes in which data transmission/reception is frequency-duplexed.

In the TDD scheme, data is transmitted/received using the same frequency band. The TDD scheme is a scheme in which a time slot is previously divided into a time slot for data transmission and a time slot for data reception. Data is transmitted using a predefined frequency band in the time slot for data transmission, and data is received using the predefined frequency band in the time slot for data reception.

In the FDD scheme, data is transmitted/received using different frequency bands, rather than using the same frequency band as in the TDD scheme. That is, the FDD scheme is a scheme in which a frequency band is previously divided into a first frequency band for data transmission and a second frequency band for data reception. Data is transmitted in the first frequency band, and data is received in the second frequency band.

The TDD scheme is disadvantageous in that scheduling for data transmission/reception is more complex than that in the FDD scheme. However, the TDD scheme is advantageous in that its frequency use efficiency is higher than that of the FDD scheme. Also, the TDD scheme is disadvantageous in that its cell coverage is smaller than that of the FDD scheme, but is advantageous in that it is easy to adjust the amount of resources for data transmission/reception, as compared to the FDD scheme.

Contrarily, the FDD scheme is disadvantageous in that its frequency use efficiency is lower than that of the TDD scheme, but is advantageous in that scheduling for data transmission/reception is less complex than that in the TDD scheme. Also, the FDD scheme is disadvantageous in that it is difficult to adjust the amount of resources for data transmission/reception, as compared to the TDD scheme, but is advantageous in that its cell coverage is larger that that of the TDD scheme and uplink feedback delay is small, as compared to the TDD scheme.

As mentioned above, the TDD and FDD schemes have reciprocal advantages/disadvantages, and thus, there is an urgent need to use a scheme mixing the TDD and FDD schemes.

SUMMARY OF THE INVENTION

The present invention has been made to address at least the above problems and/or disadvantages and to provide at least the advantages described below. Accordingly, an aspect of the present invention provides an apparatus and method for transmitting/receiving resource allocation information in a communication system, which supports both TDD and FDD schemes.

Another aspect of the present invention provides an apparatus and method for transmitting/receiving resource allocation information in a communication system, which efficiently uses uplink resources.

According to one aspect of the present invention, a method of transmitting resource allocation information by a base station in a communication system is provided. At least one of a plurality of FDD uplink Frequency Assignment (FA) resources is divided into a plurality of segment regions. First resource allocation information is transmitted to mobile stations through a plurality of TDD downlink FA resources. The first resource allocation information indicates, among the plurality of segment regions, each of segment regions corresponding to the TDD downlink FA resources.

According to another aspect of the present invention, a method of receiving resource allocation information by a mobile station in a communication system is provided. First resource allocation information is received from a base station thorough at least one TDD downlink FA resource allocated to the mobile station. The first resource allocation information indicates a segment region corresponding to the TDD downlink FA resource. The segment region is determined using the first resource allocation information. The segment region is at least one segment region that is allocated to the mobile station from among a plurality of segment regions generated by dividing at least one of a plurality of FDD uplink FA resources into a plurality of regions.

According to a further aspect of the present invention, an apparatus is provided for transmitting resource allocation information in a communication system. The apparatus includes a base station for dividing at least one of a plurality of FDD uplink FA resources into a plurality of segment regions, and transmitting first resource allocation information to mobile stations through a plurality of TDD downlink FA resources. The first resource allocation information indicates, among the plurality of segment regions, each of segment regions corresponding to the TDD downlink FA resources.

According to an additional aspect of the present invention, an apparatus is provided for receiving resource allocation information in a communication system. The apparatus includes a mobile station for receiving first resource allocation information from a base station through at least one TDD downlink FA resource allocated to the mobile station. The first resource allocation information indicates a segment region corresponding to the TDD downlink FA resource. The mobile station also determines the segment region using the first resource allocation information. The segment region is at least one segment region that is allocated to the mobile station from among a plurality of segment regions generated by dividing at least one of a plurality of FDD uplink FA resources into a plurality of regions.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF THE PREFERRED EMBODIMENT

Figure 1:
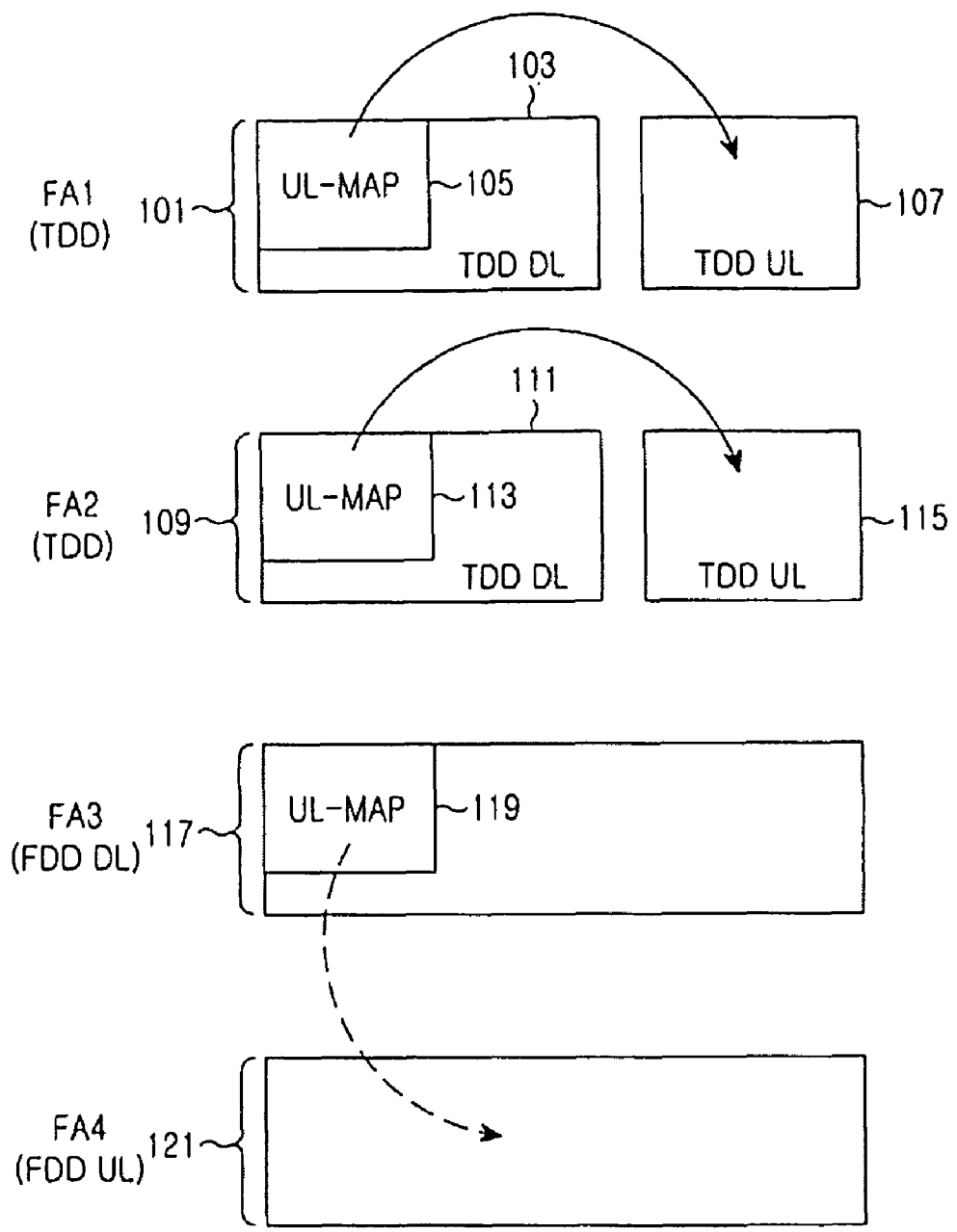
FIG. 1 is a diagram illustrating FA resources of a communication system simultaneously supporting TDD and FDD schemes.

Preferred embodiments of the present invention are described in detail with reference to the accompanying drawings. Similar components are designated by similar reference numerals although they are illustrated in different drawings. Detailed descriptions of constructions or processes known in the art may be omitted to avoid obscuring the subject matter of the present invention. Further, various specific definitions found in the following description are provided only to help general understanding of the present invention, and it is apparent to those skilled in the art that the present invention can be implemented without such definitions.

The embodiments of the present invention provide an apparatus and method for transmitting/receiving resource allocation information in a communication system employing a scheme having a mix of a Time Division Duplexing (TDD) scheme and a Frequency Division Duplexing (FDD) scheme, which efficiently uses frequency resources used for data transmission/reception, that is, Frequency Assignment (FA) resources.

In the embodiments of the present invention, it is assumed that data is transmitted/received between a transmitter and a receiver, for example, a Base Station (BS) and a Mobile Station (MS), by using TDD and FDD schemes.

A description will be given of FA resources of a communication system employing a mixed scheme of the TDD and FDD schemes, with reference to FIG. 1.

FIG. 1 illustrates a structure of FA resources of a communication system simultaneously supporting the TDD and FDD schemes.

When a BS communicates with an MS supporting the TDD scheme and an MS supporting the FDD scheme, the FA resources are divided into FA resources used in the TDD scheme and FA resources used in the FDD scheme. Also, Uplink (UL) FA resources corresponding to Downlink (DL) FA resources for the TDD scheme, and UL FA resources corresponding to DL FA resources for the FDD scheme, are predefined.

Referring to FIG. 1, the communication system includes FA resources 101, 109, 117, 121, that is, FA1 101, FA2 109, FA3 117, and FA4 121.

Since the communication system supports the TDD and FDD schemes at the same time, the first and second FA resources 101, 109 are used to support the TDD scheme, and the third and fourth FA resources 117, 121 are used to support the FDD scheme.

The first FA resource 101 is divided into a TDD DL FA resource 103 and a TDD UL FA resource 107 according to the TDD scheme, and the TDD DL FA resource 103 includes a UL-MAP 105. The UL MAP 105 includes FA resource allocation information for the TDD UL FA resource 107. Also, the second FA resource 109 is divided into a TDD DL FA resource 111 and a TDD UL FA resource 115, and the TDD DL FA resource 111 includes a UL-MAP 113. The UL-MAP 113 includes FA resource allocation information for the TDD UL FA resource 115.

The third FA resource 117 is used as an FDD DL FA resource according to the FDD scheme, and the fourth FA resource 121 is used as an FDD UL FA resource according to the FDD scheme. The third FA resource 117 includes a UL-MAP 119, and the UL-MAP 119 includes FA resource allocation information for the FDD UL FA resource 121.

As mentioned above, in a communication system simultaneously supporting the TDD and FDD schemes, each UL FA resource 107, 115, 121 corresponding to each DL FA resource 103, 111, 117 is fixed. On account of this, although FA resources that are not actually used in data transmission/reception exist, there is no way to utilize them. Reference will now be made to FA resources proposed in the present invention, with reference to FIG. 2.

Figure 2:
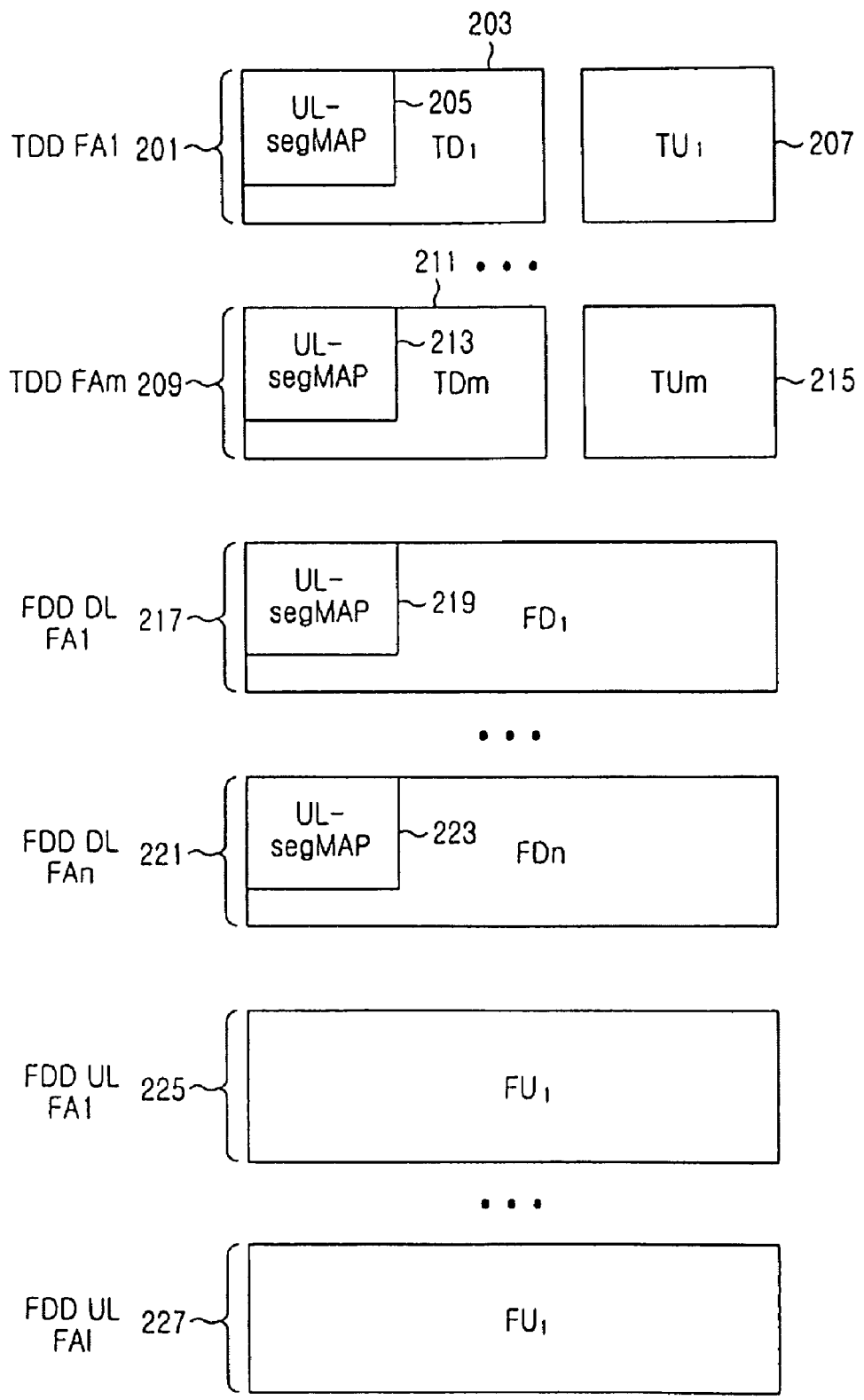
FIG. 2 is a diagram illustrating FA resources of a communication system simultaneously supporting TDD and FDD schemes in accordance with an embodiment of the present invention.

FIG. 2 illustrates a structure of FA resources of a communication system simultaneously supporting the TDD and FDD schemes according to an embodiment of the present invention.

Referring to FIG. 2, the communication system includes m FA resources 201, 209 supporting the TDD scheme, n DL FA resources 217, 221 supporting the FDD scheme, and l UL FA resources 225, 227 supporting the FDD scheme.

The m TDD FA resources 201, 209 include a first TDD DL (TD) FA resource 203 to an mth TDD DL (TD) FA resource 211, and a first TDD UL (TU) FA resource 207 to an mth TDD UL (TU) FA resource 215. The first to mth TDD DL (TD) FA resources 203 to 211 include UL-segMAPs 205, 213. Each of the UL-segMAPs 205, 213 includes FA resource allocation information for the corresponding TDD UL (TU) FA resource. The n FDD DL FA resources 217, 221 include a first FDD DL (FD) FA resource 217 to an nth FDD DL (FD) FA resource 221, and the first to nth FDD DL (FD) FA resources 217 to 221 include UL-segMAPs 219, 223. Each of the UL-segMAPs 219, 223 includes FA resource allocation information for the corresponding FDD UL FA resource. The l FDD UL FA resources 225, 227 include a first FDD UL (FU) FA resource 225 to an lth FDD UL (FU) FA resource 227.

Here, one TDD DL FA resource, one TDD UL FA resource, one FDD DL FA resource and, one FDD UL FA resource may be considered the unit of a frame or a subframe into which to divide a frame.

In the embodiments of the present invention, an MS supports the TDD scheme when data is transmitted/received using TDD DL and UL FA resources, and supports the FDD scheme when data is transmitted/received using different duplexing schemes or FDD DL and UL FA resources.

For example, when the first TDD DL FA resource 203 and the first TDD UL FA resource 207 are used, an MS supports the TDD scheme. Also, when the first TDD DL FA resource 203, the third TDD DL FA resource (not illustrated), the first TDD UL FA resource 207, and the third TDD UL FA resource (not illustrated) are used, an MS supports the TDD scheme.

As another example, when the first FDD DL FA resource 217 and the first FDD UL FA resource 225 are used an MS supports the FDD scheme. Also, when the first FDD DL FA resource 217, the third TDD UL FA resource (not illustrated) are used or the first FDD DL FA resource 217, the third FDD DL FA resource (not illustrated), and the third FDD UL FA resource (not illustrated) are used, an MS supports the FDD scheme.

In this way, the TDD/FDD DL FA resources 203, 211, 219, 223 correspond to the TDD/FDD UL FA resources 207, 215, 225, 227 respectively. If the amount of UL traffic increases in a first MS using the first FDD DL FA resource 217 and the first FDD UL FA resource 225, then the first MS may be short of the first FDD UL FA resource 225. In such a situation, if the amount of UL traffic is small in a second using the second FDD DL FA resource (not illustrated) and the second FDD UL FA resource (not illustrated), then the second MS may be in excess of the second FDD UL FA resource (not illustrated). Thus, a BS can solve the shortage of the UL FA resource for the first MS by allocating a part of the second FDD UL FA resource (not illustrated) to the first MS. In order to allocate an unused UL FA resource to an MS that is short of an UL FA resource, a BS divides any FDD UL FA resource into a plurality of regions to thereby generate UL segment regions, and transmits resource allocation information for the generated segment regions to a plurality of MSs using one of any TDD DL FA resource and any FDD DL FA resource. Then, the plurality of MSs employing the TDD or FDD scheme can use the divided FDD UL FA resource. Reference will now be made to sharing of FA resources by a communication system simultaneously supporting the TDD and FDD schemes, with reference to FIG. 3.

Figure 3:
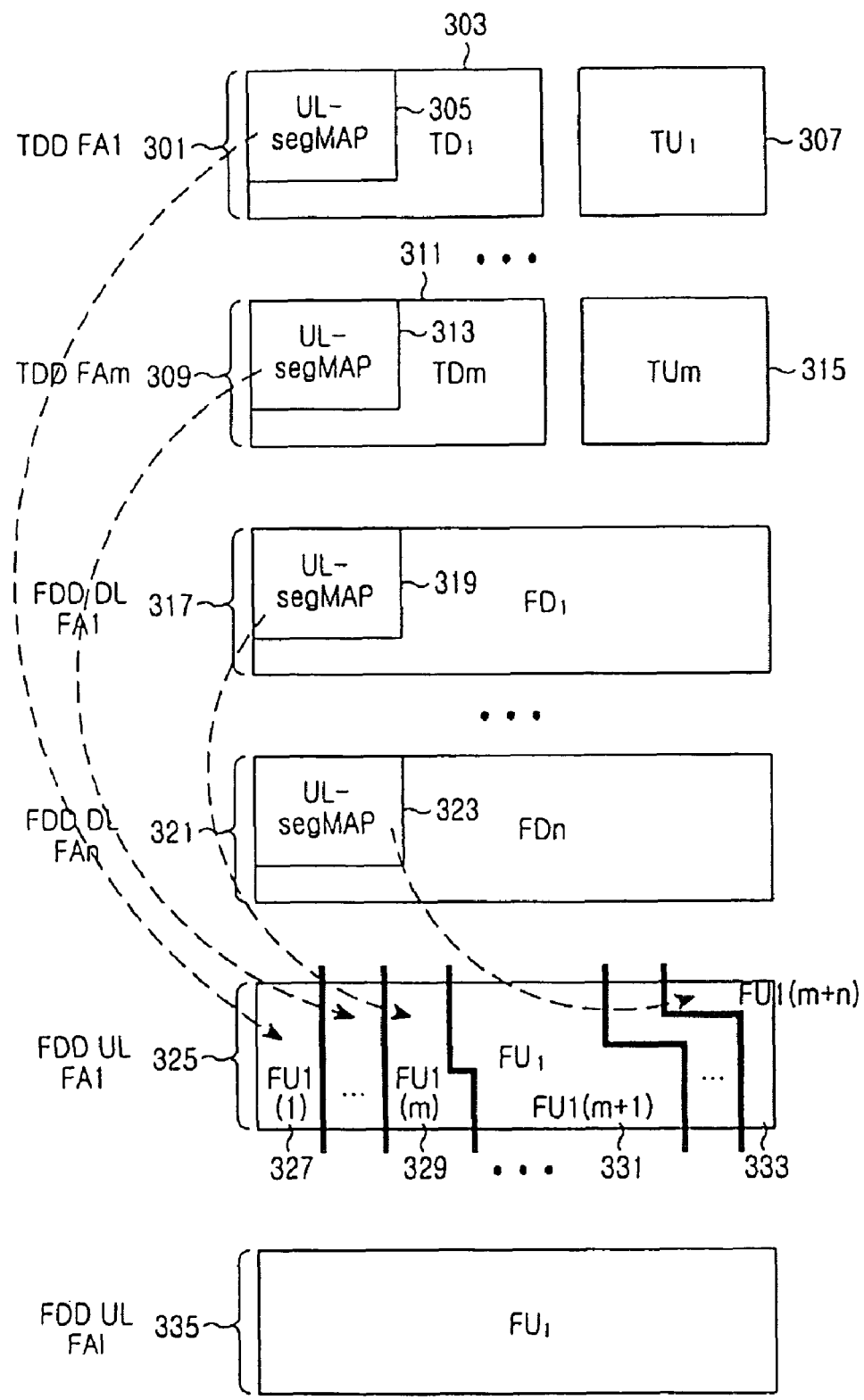
FIG. 3 is a diagram illustrating sharing of a resource in a communication system in accordance with an embodiment of the present invention.

FIG. 3 illustrates sharing of resources in a communication system according to an embodiment of the present invention.

Referring to FIG. 3, the communication system includes m FA resources 301, 309 supporting the TDD scheme, n DL FA resources 317, 321 supporting the FDD scheme, and l UL FA resources 325, 335 supporting the FDD scheme.

The TDD FA resources 301, 309 include a first TDD DL FA resource 303 to an mth TDD DL FA resource 311, and a first TDD UL FA resource 307 to an mth TDD UL FA resource 315. The first to mth TDD DL FA resources 303 to 311 include UL-segMAPs 305, 313. Each of the UL-segMAPs 305, 313 includes FA resource allocation information for the corresponding TDD UL FA resource.

The FDD DL FA resources 317, 321 include a first FDD DL FA resource 317 to an nth FDD DL FA resource 321, and the first to nth FDD DL FA resources 317 to 321 include UL-segMAPs 319, 323. Each of the UL-segMAPs 319, 323 includes FA resource allocation information for the corresponding FDD UL FA resource. The FDD UL FA resources 325, 335 include a first FDD UL FA resource 325 to an lth FDD UL FA resource 335. In the present invention, one FDD UL FA resource 325 is divided into a maximum of (m+n) logical regions (hereinafter referred to as "segment regions") 327, 329, 331, 333. Also, the TDD and FDD DL FA resources 303, 311, 317, 321 include UL-segMAPs 305, 313, 319, 323 respectively. Each of the UL-segMAPs 305, 313, 319, 323 includes at least one resource allocation information for the segment regions 327, 329, 331, 333. Here, each of the UL-segMAPs may be included in a UL-MAP region that has been included in an existing UL FA resource or may be included in a region other than the UL-MAP region. Additionally, a UL-MAP included in the UL-MAP region may also be one of the UL-segMAPs.

When the first TDD DL FA resource 303 corresponds to the first TDD UL FA resource 307, the mth TDD DL FA resource 311 corresponds to the mth TDD UL FA resource 315, the first FDD DL FA resource 317 corresponds to the first FDD UL FA resource 325, and the nth FDD DL FA resource 321 corresponds to the lth FDD UL FA resource 335, UL-segMAPs including resource allocation information for the TDD UL FA resources 307, 315 are included in the TDD DL FA resources 303, 311, and UL-segMAPs including resource allocation information for the FDD UL FA resources 335 are included in the FDD DL FA resources 317, 323.

In conclusion, the TDD DL FA resources 303, 311 include UL-segMAPs for the TDD UL FA resources 307, 315, and UL-segMAPs for the first to mth segment regions 327, 329. Also, the second to nth FDD DL FA resources 321 include UL-segMAPs for the second to lth FDD UL FA resources 335, and the FDD DL FA resources 317, 321 include UL-segMAPs for the (m+1)th to (m+n)th segment regions 331, 333.

Each of the segment regions 327, 329, 331, 333 may have a dynamic size or a fixed size according to system settings, etc.

More specially, the first UL-segMAP indicating resource allocation information for the first segment (FU1(1)) region 327 is included in the first TDD DL FA resource 303, the mth UL-segMAP indicating resource allocation information for the mth segment (FU1($m$)) region 329 is included in the mth TDD DL FA resource 311, the (m+1)th UL-segMAP indicating resource allocation information for the (m+1)th segment (FU1($m$+1)) region 331 is included in the first FDD DL FA resource 317, and the UL-segMAP indicating resource allocation information for the (m+n)th segment (FU1($m$+n)) region 333 is included in the nth FDD DL FA resource 321.

Although in this embodiment, the BS has been described to divide one FDD UL FA resource 325 into the plurality of segment regions 327, 328, 331, 333, by way of example, it may also divide a plurality of FDD UL FA resources or a plurality of TDD UL FA resources into a plurality of segment regions. Reference will now be made to a communication system which includes a plurality of TDD FA resources and one FDD UL FA resource, and in which the FDD UL FA resource is divided into a plurality of segments, with reference to FIG. 4.

Figure 4:
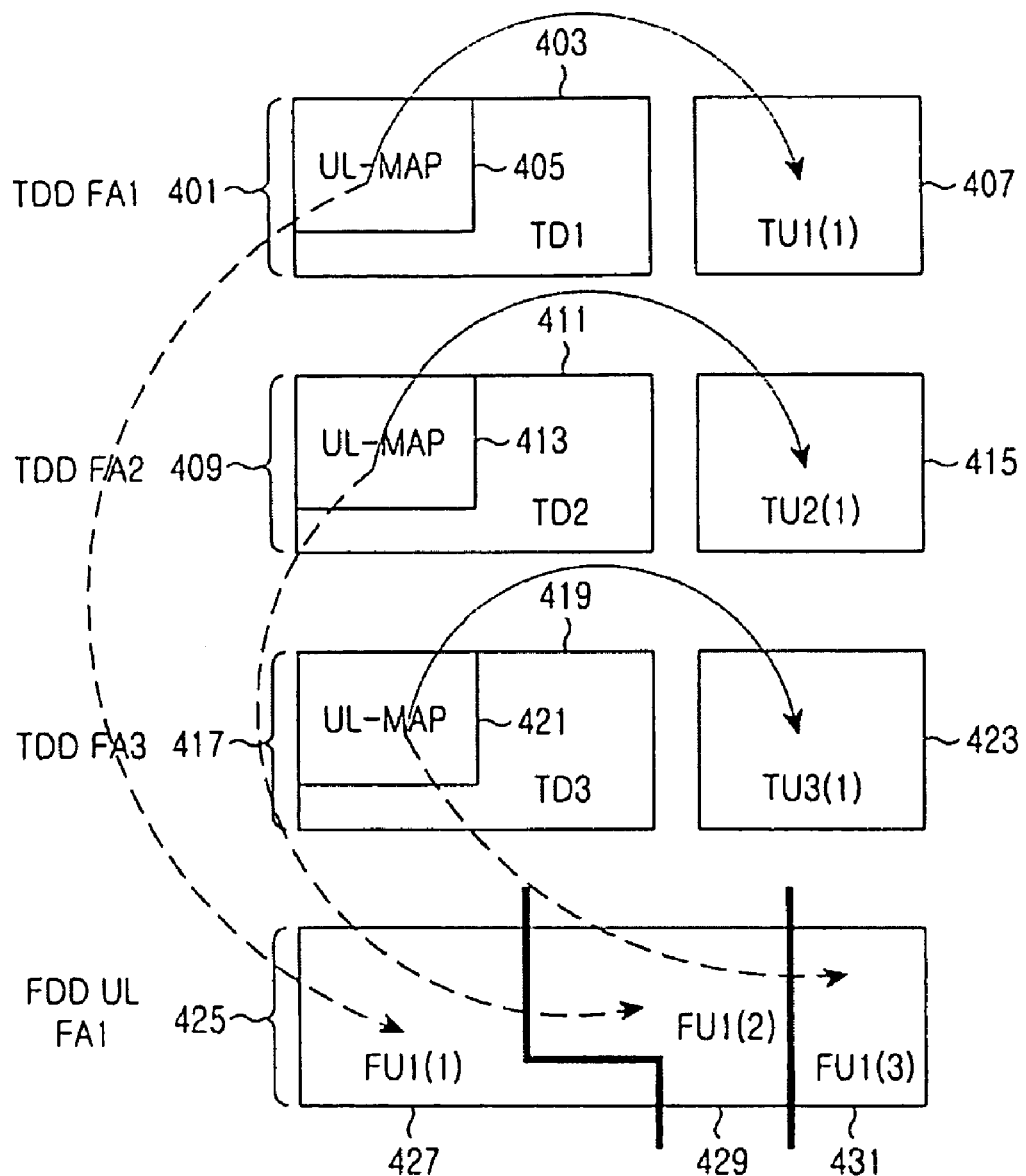
FIG. 4 is a diagram illustrating division of an FDD unlink FA resource in a communication system in accordance with an embodiment of the present invention.

FIG. 4 illustrates division of an FDD UL FA resource in a communication system according to an embodiment of the present invention.

Referring to FIG. 4, it is assumed that the communication system includes three TDD FA resources 401, 409, 417 and one FDD UL FA resource 425, and a BS divides the FDD UL FA resource 425 into three segment regions 427, 429, 431.

Also, let us suppose that a first MS uses a first TDD DL FA resource 403 and a first TDD UL FA resource 407 included in the first TDD FA resource 401, a second MS uses a second TDD DL FA resource 411 and a second TDD UL FA resource 415 included in the second TDD FA resource 409, and a third MS uses a third TDD DL FA resource 419 and a third TDD UL FA resource 423 included in the third TDD FA resource 417.

Further, as an example a fourth MS uses the first TDD DL FA resource 403 and the first segment (FU1(1)) 427, a fifth MS uses the second TDD DL FA resource 411 and the second segment (FU1(2)) 429, and a sixth MS uses the third TDD DL FA resource 419 and the third segment (FU1(3)) 431.

Since the fourth to sixth MSs share the FDD UL FA resource 425 so as to transmit UL data, the BS transmits resource allocation information for the first FDD UL FA resource 425, that is, resource allocation information for the segment regions 429, 431, 433, to the fourth to sixth MSs through the TDD DL FA resources 403, 411, 419.

However, if the size of the FDD UL FA resource 425 increases, then the size of the resource allocation information also increases, which causes a problem of an increase in overhead.

To solve this problem, the BS may transmit each of the resource allocation information to the fourth to sixth MSs through each of the TDD DL FA resources 403, 411, 419.

More specially, the BS transmits a UL-segMAP including resource allocation information for the first segment (FU1(1)) region 427 and a UL-MAP or UL-segMAP including resource allocation information for the first TDD UL FA resource 407 through the UL-MAP region 405 of the first TDD DL FA resource 403, transmits a UL-segMAP including resource allocation information for the second segment (FU1(2)) region 429 and a UL-MAP or UL-segMAP including resource allocation information for the second TDD UL FA resource 415 through the UL-MAP region 413 of the second TDD DL FA resource 411, and transmits a UL-segMAP including resource allocation information for the third segment (FU1(3)) region 431 and a UL-MAP or UL-segMAP including resource allocation information for the third TDD UL FA resource 423 through the UL-MAP region 421 of the third TDD DL FA resource 419.

As mentioned above, one TDD DL FA resource 403 includes a UL-segMAP for one segment region 427 and a UL-segMAP for a TDD UL FA resource 407 corresponding to the TDD DL FA resource 403. Thus, each TDD DL FA resource 403, 411, 419 may include a plurality of UL-segMAPs. Reference will now be made to a UL-MAP structure including a plurality of UL-segMAPs, with reference to FIG. 5.

FIG. 5 illustrates a UL-MAP structure in a communication system according to an embodiment of the present invention.

Referring to FIG. 5, when a UL-MAP includes at least two UL-segMAPs, a BS represents the UL-MAP structure by using a segment index (SegIndex) scheme or segment combination index (SegComb Index) scheme.

Figure 5A:
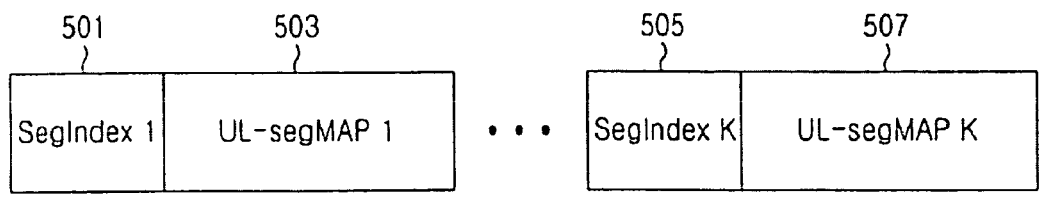
FIG. 5 is a diagram illustrating a UL-MAP structure in a communication system in accordance with an embodiment of the present invention.

Here, the DL-MAP structure in FIG. 5 will be described in connection with the FA resources 401, 409, 417, 425 in FIG. 4. FIG. 5a illustrates a UL-MAP structure in the case of using the SegIndex scheme, and FIG. 5b illustrates a UL-MAP structure in the case of using the SegComb Index scheme.

Referring to FIG. 5a, the UL-MAP includes k UL-segMAPs 503, 507 and k segment indexes 501, 505, each of which is positioned between the UL-segMAPs 503, 507. Here, any segment index indicates attributes of the corresponding UL-segMAP. That is, the first segment index 501 indicates attributes of the first UL-segMAP 503, and the kth segment index 505 indicates attributes of the kth UL-segMAP 507. For example, as described in detail in FIG. 4, two UL-segMAPs are carried by the UL-MAP region 405 included in the first TDD DL FA resource 403. If the segment indexes are a 2-bit index, the first segment index 501 is represented by "00" when the first UL-segMAP 503 indicates resource allocation information for the first TDD UL FA resource 407. Also, when the first UL-segMAP 503 indicates resource allocation information for the first segment region 427, the first segment index 501 is represented by "01". Further, the first segment index 501 is represented by "10" when the first UL-segMAP 503 does not include specific UL-segMAP resource allocation information (none), and is represented by "11" when the first UL-segMAP 503 is reserved.

Figure 5B:
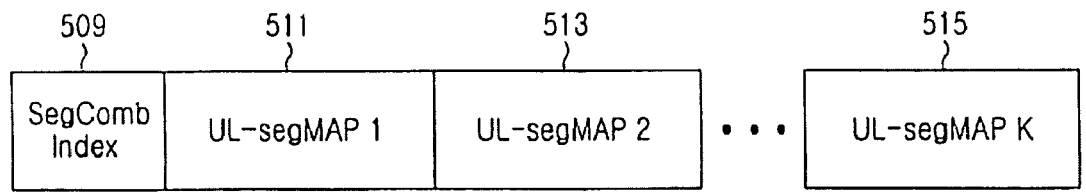

Referring to FIG. 5b, the UL-MAP includes k UL-segMAPs 511, 513, 515 and a segment combination index 509 positioned at the beginning of the UL-segMAPs 511, 513, 515. Here, the segment combination index 509 is one collective index representing a combination of the UL-segMAPs 511, 513, 515, and indicates attributes of the UL-segMAPs 511, 513, 515.

For example, as described in detail in FIG. 4, two UL-segMAPs are carried by the UL-MAP region 405 included in the first TDD DL FA resource 403. If the segment combination index 509 is a 2-bit index, the segment combination index 509 is represented by "00" when any one of the first and second UL-segMAPs 511, 513 indicates resource allocation information for the first TDD UL FA resource 407. Also, when any one of the first and second UL-segMAPs 511, 513 indicates resource allocation information for the first segment region 427, the segment combination index 509 is represented by "01". Further, the segment combination index 509 is represented by "10" when the first and second UL-segMAPs 511, 513 indicate resource allocation information for the first TDD UL FA resource 407 and resource allocation information for the first segment region 427, and is represented by "11" when the first and second UL-segMAPs 511, 513 do not include specific UL-segMAP resource allocation information or are reserved.

It is assumed herein that when the segment combination index 509 uses a value of "10", the order of the UL-segMAPs 511, 513 is predetermined. In this way, a UL-MAP structure including at least two UL-segMAPs can be represented using the segment combination index 509.

Although the segment index 501 and the segment combination index 509 have been assumed as a 2-bit index in FIG. 5, the segment index 501 and the segment combination index 509 may be set as a two or more-bit index when the number of segments included in any TDD or FDD UL FA resource increases, or the number of UL-segMAPs includable in the UL-MAP region of any TDD or FDD DL FA resource increases. Also, when the number of segments is small, the segment index 501 and the segment combination index 509 may be set as a 1-bit index. Reference will now be made to an operation of a BS according to the present invention, with reference to FIG. 6.

Figure 6:
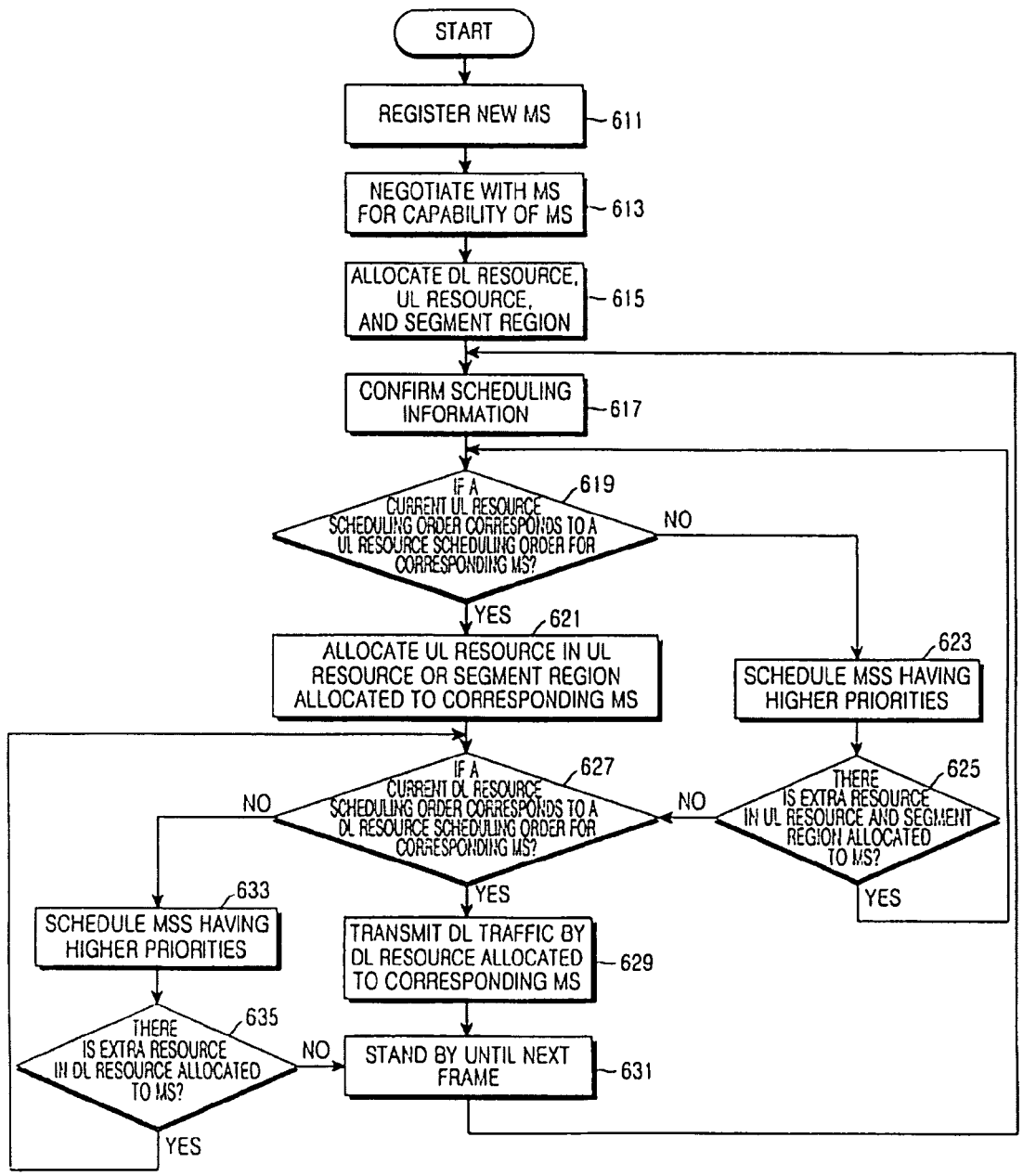
FIG. 6 is a flowchart illustrating an operation of a base station in a communication system in accordance with an embodiment of the present invention.

FIG. 6 illustrates an operation of a BS in a communication system according to an embodiment of the present invention.

Referring to FIG. 6, in step 611, the BS registers a new MS, and then proceeds to step 603. That is, whenever there is an MS entering a cell under the control of the BS, the BS registers the MS as a new MS.

In step 613, the BS negotiates the capability of the new MS, and then proceeds to step 615. In the negotiation procedure, the BS negotiates with the new MS for the duplexing mode of the new MS and an FA resource list supportable by the new MS.

In step 615, the BS allocates at least one of a DL FA resource, a UL FA resource, and a segment region to the new MS, and then proceeds to step 617. When the BS allocates the DL FA resource, the UL FA resource, and the segment region, it takes account of its available FA resource list, and attributes of the FA resources. The FA resource list is supportable by the new MS, and the duplexing mode of the new MS.

The BS may allocate at least one DL FA resource, at least one UL FA resource, and at least one segment region to one new MS respectively. That is, in the initial negotiation procedure, the BS determines segment regions to be allocated to each new MS, and from frame to frame, changes the position and size of a resource to be allocated to each new MS within the determined segment regions. For example, in a general communication system supporting the TDD scheme, a region for transmitting/receiving UL traffic is determined as a UL subframe, and the position and size of a resource to be actually allocated to an MS within the UL subframe are changed in each frame.

In step 617, the BS confirms scheduling information, and then proceeds to step 619. The scheduling information includes the service class and UL/DL traffic status of each MS. The UL/DL traffic status may be detected by a bandwidth request technique of each MS. The BS determines the priority of each MS by confirming the scheduling information. Factors considered in scheduling may be diversified according to attributes of a scheduler included in the BS. For example, such factors may include the channel condition and QoS class of each MS, as well as the service class and UL/DL traffic status. Here, the channel condition may be confirmed using information fed back from each MS to the BS. Also, the QoS class may be confirmed by the negotiation between each MS and the BS.

In step 619, the BS checks if the current UL resource scheduling order corresponds to the UL resource scheduling order for a corresponding MS. When a result of the check in step 619 shows that the current UL resource scheduling order corresponds to the UL resource scheduling order for the corresponding MS, the BS proceeds to step 621, and otherwise, proceeds to step 623.

In general, the BS performs UL resource scheduling, and then performs DL resource scheduling. Contrarily, the BS may also perform DL resource scheduling, and then perform UL resource scheduling. However, in the present invention, UL resource scheduling followed by DL resource scheduling will be described. Also, the scheduling is performed in order from an MS with the highest priority to an MS with the lowest priority according to the determined priority of each MS. If the corresponding MS is allocated a plurality of UL resources and segment regions, then the BS may variably schedule the UL resources according to a predetermined setting order, etc.

In step 623, the BS performs the UL resource scheduling from MSs that have priorities preceding that of the corresponding MS, and then proceeds to step 625.

In step 625, the BS determines if there is an extra resource in a UL FA resource and a segment region to be allocated to any MS.

When a result of the determination in step 625 shows that there is an extra resource allocable to the corresponding MS, the BS proceeds to step 619, and otherwise, the BS proceeds to step 627. The BS repeats steps 619, 623 and 625 until there is no extra resource or all MSs have no traffic to be transmitted.

In step 621, the BS allocates a UL resource in at least one of the UL FA resource and the segment region allocated to the corresponding MS, and then proceeds to step 627.

In step 627, the BS checks if the current DL resource scheduling order corresponds to the DL resource scheduling order for the corresponding MS. When a result of the check in step 627 shows that the current DL resource scheduling order corresponds to the DL resource scheduling order for the corresponding MS, the BS proceeds to step 629, and otherwise, proceeds to step 633. Once the UL resource scheduling is completed, the BS performs the DL resource scheduling.

In step 633, the BS performs the DL resource scheduling from MSs that have priorities preceding that of the corresponding MS, and then proceeds to step 635. In step 635, the BS determines if there is an extra resource in a DL region to be allocated to any MS.

When a result of the determination in step 635 shows that there is a DL FA resource allocable to the corresponding MS, the BS proceeds to step 627, and otherwise, the BS proceeds to step 631.

In step 629, the BS transmits DL traffic to the corresponding MS using the DL FA resource allocated to the corresponding MS, and then proceeds to step 631. Here, the BS transmits a UL-segMAP proposed in the present invention to the corresponding MS through the DL FA resource. The UL-segMAP includes resource allocation information for a UL FA resource corresponding to the DL FA resource or resource allocation information for the segment region. A UL-MAP transmitting the UL-segMAPs includes segment indexes or a segment combination index as described above in FIG. 5.

In step 631, the BS stands by until the next frame arrives, and then proceeds to step 617.

The aforementioned BS scheduling operation may also be performed by a scheduler provided inside of the BS.

Reference will now be made to an operation of an MS according to the present invention, with reference to FIG. 7.

Figure 7:
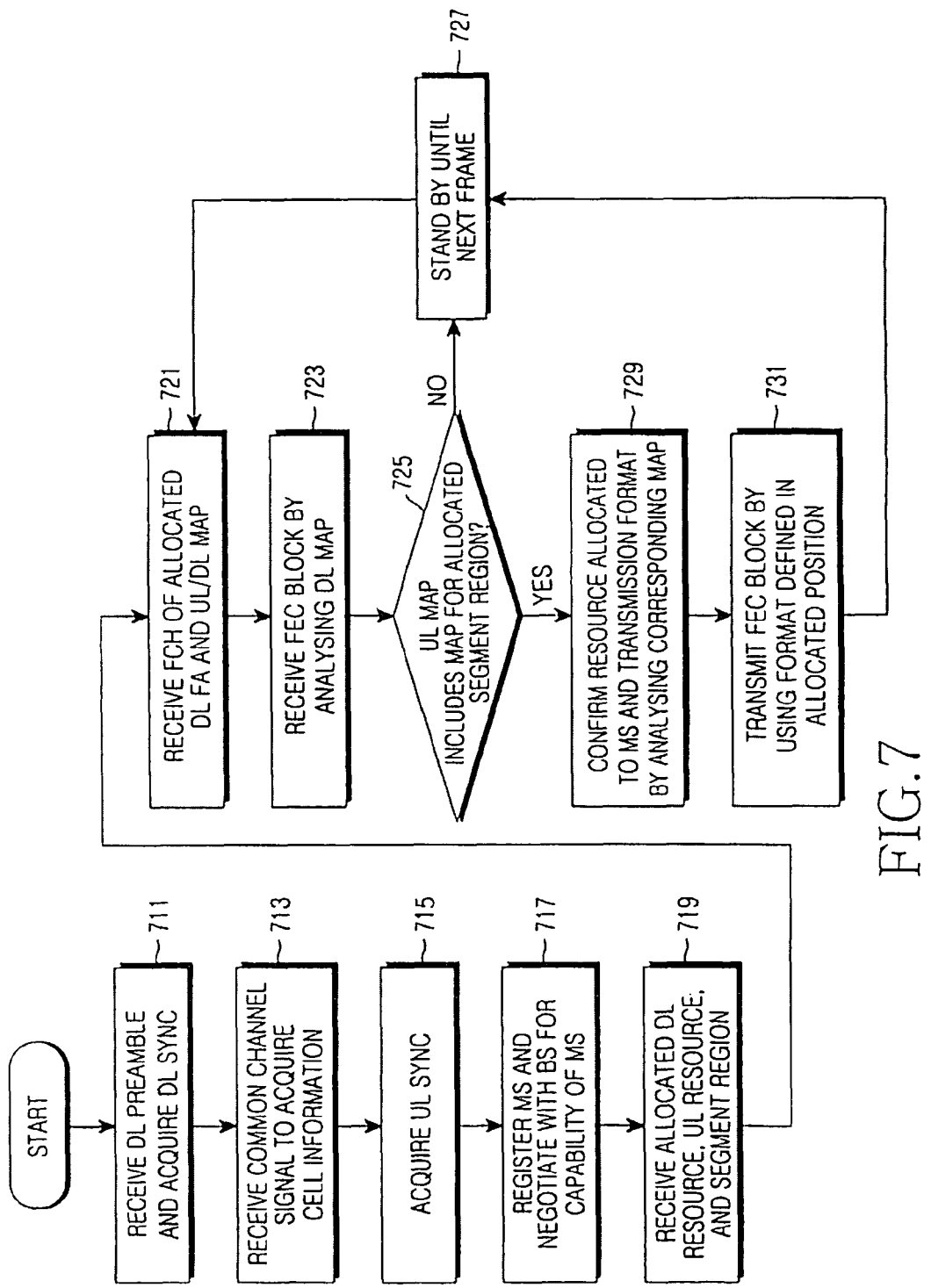
FIG. 7 is a flowchart illustrating an operation of a mobile station in a communication system in accordance with an embodiment of the present invention.

FIG. 7 illustrates an operation of an MS in a communication system according to an embodiment of the present invention.

Referring to FIG. 7, in step 711, the MS receives a DL preamble signal to acquire DL synchronization, and then proceeds to step 713.

In step 713, the MS receives a common channel signal to acquire information on a cell or a BS, to which the MS belongs, by using the received common channel signal, and then proceeds to step 715.

In step 715, the MS acquires UL synchronization, and then proceeds to step 717. The MS acquires the UL synchronization by performing initial ranging.

In step 717, the MS registers itself with a BS and negotiates with the BS for its capability, and then proceeds to step 719. Here, the MS negotiates with the BS for its available FA resource list and whether or not to support the TDD/FDD scheme.

In step 719, the MS is allocated a DL FA resource, a UL FA resource, and a segment region from the BS, and then proceeds to step 721.

In step 721, the MS receives a frame control header (FCH) for the allocated DL FA resource and a UL/DL-MAP, and then proceeds to step 723.

In step 723, the MS parses the DL-MAP to receive data, for example, Forward Error Correction (FEC) blocks for the MS, decodes the received FEC blocks, and then proceeds to step 725.

In step 725, the MS checks if the UL-MAP includes a MAP, for example, a UL-segMAP for the allocated segment region.

When a result of the check in step 725 shows that the UL-MAP includes a UL-segMAP for the allocated segment region, the MS proceeds to step 729, and otherwise, proceeds to step 727.

In step 727, the MS stands by until the next frame arrives, and then proceeds to step 721.

In step 729, the MS parses the UL-segMAP to confirm the position of a UL resources allocate thereto and the transmission format of the FEC blocks, and then proceeds to step 731.

In step 731, the MS positions data, that is, FEC blocks converted into the transmission format, in the confirmed position of the allocated UL resource, transmits the converted data by using the allocated UL resource, and then proceeds to step 727.

As all example, the BS and the MS allocates the UL/DL resource in a cycle of one frame, in a predetermined period, or in a cycle of one or more frames.

As described above, the embodiments of the present invention can support both the TDD and FDD schemes. Also, the embodiments of the present invention present invention enable an MS supporting the FDD scheme to flexibly change DL and UL resources. Further, the embodiments of the present invention enable MSs using different DL resources to share one UL resource and operate different numbers of DL and UL resources.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of transmitting resource allocation information by a base station in a communication system, the method comprising the steps of:
   dividing at least one of a plurality of Frequency Division Duplexing (FDD) uplink Frequency Assignment (FA) resources into a plurality of segment regions; and
   transmitting first resource allocation information to mobile stations through a plurality of Time Division Duplexing (TDD) downlink FA resources, wherein the first resource allocation information indicates each of a plurality of segment regions that corresponds to the plurality of TDD downlink FA resources among the plurality of segment regions;
   wherein the step of transmitting the first resource allocation information comprises transmitting second resource allocation information indicating each of a plurality of TDD uplink FA resources that corresponds to the plurality of TDD downlink FA resources, together with the first resource allocation information, to the mobile stations; and
   wherein the first resource allocation information and the second resource allocation information are comprised in Uplink MAPs (UL-MAPs) of the plurality of TDD downlink FA resources.

2. The method of claim 1, wherein each of the UL-MAPs comprises segment indexes indicating an attribute of each of the first resource allocation information and the second resource allocation information comprised in each of the UL-MAPs.

3. The method of claim 1, wherein each of the UL-MAPs comprises a segment combination index indicating an overall attribute of the first resource allocation information and the second resource allocation information comprised in each of the UL-MAPs.

4. The method of claim 1, further comprising transmitting third resource allocation information to the mobile stations through a plurality of FDD downlink FA resources, wherein the third resource allocation information indicates each of a plurality of segment regions that corresponds to the plurality of FDD downlink FA resources among the plurality of segment regions.

5. The method of claim 4, wherein transmitting the third resource allocation information comprises transmitting fourth resource allocation information indicating each of a plurality of FDD uplink FA resources corresponding to the plurality of FDD downlink FA resources, together with the third resource allocation information, to the mobile stations.

6. A method of receiving resource allocation information by a mobile station in a communication system, the method comprising the steps of:
   receiving first resource allocation information from a base station through at least one Time Division Duplexing (TDD) downlink Frequency Assignment (FA) resource allocated to the mobile station, wherein the first resource allocation information indicates a segment region corresponding to the TDD downlink FA resource; and
   determining the segment region using the first resource allocation information, wherein the segment region is at least one segment region that is allocated to the mobile station from among a plurality of segment regions generated by dividing at least one of a plurality of Frequency Division Duplexing (FDD) uplink FA resources into a plurality of regions;
   wherein the step of receiving the first resource allocation information comprises receiving second resource allocation information indicating a TDD uplink FA resource corresponding to the TDD downlink FA resource, together with the first resource allocation information, from the base station, wherein the TDD uplink FA resource is at least one TDD uplink FA resource that is allocated to the mobile station from among a plurality of TDD uplink FA resources; and
   wherein the first resource allocation information and the second resource allocation information are comprised in uplink MAPs (UL-MAPs) of the at least one TDD downlink FA resource.

7. The method of claim 6, wherein each of the UL-MAPs comprises segment indexes indicating an attribute of each of the first resource allocation information and the second resource allocation information comprised in each of the UL-MAPs.

8. The method of claim 6, wherein each of the UL-MAPs comprises a segment combination index indicating an overall attribute of the first resource allocation information and the second resource allocation information comprised in each of the UL-MAPs.

9. The method of claim 6, further comprising:
   receiving third resource allocation information from the base station through at least one FDD downlink FA resource allocated to the mobile station, wherein the third resource allocation information indicates at least one segment region corresponding to the at least one FDD downlink FA resource among the plurality of segment regions; and
   determining the segment region using the third resource allocation information.

10. The method of claim 9, wherein receiving the third resource allocation information comprises receiving fourth resource allocation information indicating an FDD uplink FA resource corresponding to the at least one FDD downlink FA resource, together with the third resource allocation information, from the base station, wherein the FDD uplink FA resource is at least one FDD uplink FA resource allocated to the mobile station.

11. An apparatus for transmitting resource allocation information in a communication system, the apparatus comprising:
   a base station for dividing at least one of a plurality of Frequency Division Duplexing (FDD) uplink Frequency Assignment (FA) resources into a plurality of segment regions, and transmitting first resource allocation information to mobile stations through a plurality of Time Division Duplexing (TDD) downlink FA resources, wherein the first resource allocation information indicates each of a plurality of segment regions corresponding to the plurality of TDD downlink FA resources among the plurality of segment regions;
   wherein the base station transmits second resource allocation information indicating each of a plurality of TDD uplink FA resources that corresponds to the plurality of TDD downlink FA resources, together with the first resource allocation information, to the mobile stations; and wherein the first resource allocation information and the second resource allocation information are comprised in Uplink MAPs (UL-MAPs) of the plurality of TDD downlink FA resources.

12. The apparatus of claim 11, wherein each of the UL-MAPs comprises segment indexes indicating an attribute of each of the first resource allocation information and the second resource allocation information comprised in each of the UL-MAPs.

13. The apparatus of claim 11, wherein each of the UL-MAPs comprises a segment combination index indicating an overall attribute of the first resource allocation information and the second resource allocation information included in each of the UL-MAPs.

14. The apparatus of claim 11, wherein the base station transmits third resource allocation information to the mobile stations through a plurality of FDD downlink FA resources, wherein the third resource allocation information indicates each of a plurality of segment regions that corresponds to the plurality of FDD downlink FA resources among the plurality of segment regions.

15. The apparatus of claim 14, wherein the base station transmits fourth resource allocation information indicating each of a plurality of FDD uplink FA resources corresponding to the plurality of FDD downlink FA resources, together with the third resource allocation information, to the mobile stations.

16. An apparatus for receiving resource allocation information in a communication system, the apparatus comprising:
a mobile station for receiving first resource allocation information from a base station through at least one Time Division Duplexing (TDD) downlink Frequency Assignment (FA) resource allocated to the mobile station, wherein the first resource allocation information indicates a segment region corresponding to the at least one TDD downlink FA resource, and determining the segment region using the first resource allocation information, wherein the segment region is at least one segment region that is allocated to the mobile station from among a plurality of segment regions generated by dividing at least one of a plurality of Frequency Division Duplexing (FDD) uplink FA resources into a plurality of regions;
wherein the mobile station receives second resource allocation information indicating a TDD uplink FA resource corresponding to the TDD downlink FA resource, together with the first resource allocation information, from the base station, wherein the TDD uplink FA resource is at least one TDD uplink FA resource that is allocated to the mobile station from among a plurality of TDD uplink FA resources; and
wherein the first resource allocation information and the second resource allocation information are comprised in uplink MAPs (UL-MAPs) of the at least one TDD downlink FA resource.

17. The apparatus of claim 16, wherein each of the UL-MAPs comprises segment indexes indicating an attribute of each of the first resource allocation information and the second resource allocation information comprised in each of the UL-MAPs.

18. The apparatus of claim 16, wherein each of the UL-MAPs comprises a segment combination index indicating an overall attribute of the first resource allocation information and the second resource allocation information comprised in each of the UL-MAPs.

19. The apparatus of claim 16, wherein the mobile station receives third resource allocation information from the base station through at least one FDD downlink FA resource allocated to the mobile station, wherein the third resource allocation information indicates at least one segment region corresponding to the at least one FDD downlink FA resource among the plurality of segment regions, and determines the at least one segment region using the third resource allocation information .

20. The apparatus of claim 19, wherein the mobile station receives fourth resource allocation information indicating an FDD uplink FA resource corresponding to the FDD downlink FA resource, together with the third resource allocation information, from the base station, wherein the FDD uplink FA resource is at least one FDD uplink FA resource that is allocated to the mobile station.

* * * * *